United States Patent [19]

Barney

[11] Patent Number: 5,103,728
[45] Date of Patent: Apr. 14, 1992

[54] INK LEVEL CONTROL SYSTEM FOR OFFSET PRINTING PRESSES

[75] Inventor: Alan F. Barney, Bethel, Conn.

[73] Assignee: Baldwin Technology Corporation, Stamford, Conn.

[21] Appl. No.: 530,740

[22] Filed: May 29, 1990

[51] Int. Cl.⁵ .................... B41F 31/06; B41F 31/08
[52] U.S. Cl. .................................... 101/364; 101/484
[58] Field of Search ............... 101/350, 364, 363, 148, 101/207–210, 484; 73/290 V; 367/908; 364/509; 222/71; 141/95, 198; 340/621

[56] References Cited

U.S. PATENT DOCUMENTS

| | | | |
|---|---|---|---|
| 3,025,798 | 3/1962 | Coberly et al. | 103/46 |
| 3,373,052 | 3/1968 | Rode | 117/111 |
| 3,848,529 | 11/1974 | Gegenheimer et al. | 101/363 |
| 4,010,683 | 3/1977 | Lambert et al. | 101/366 |
| 4,479,433 | 10/1984 | MacPhee et al. | 101/364 |
| 4,853,901 | 8/1989 | Barber | 73/290 V |
| 4,890,266 | 12/1989 | Woodward | 73/290 V |

Primary Examiner—J. Reed Fisher
Attorney, Agent, or Firm—Morgan & Finnegan

[57] ABSTRACT

An apparatus for monitoring and controlling the level of the ink in the ink fountain of offset printing presses, using an ultrasonic transducer for measuring the distance between the ink and the transducer which includes a microprocessor system for calculating a time duration of an ink feed cycle to fill the ink fountain to a preset ink level and for generating an ink cycle control signal based on time duration data and ink viscosity characteristics. A control valve activated by the ink cycle control signal delivers ink to the ink fountain.

12 Claims, 6 Drawing Sheets

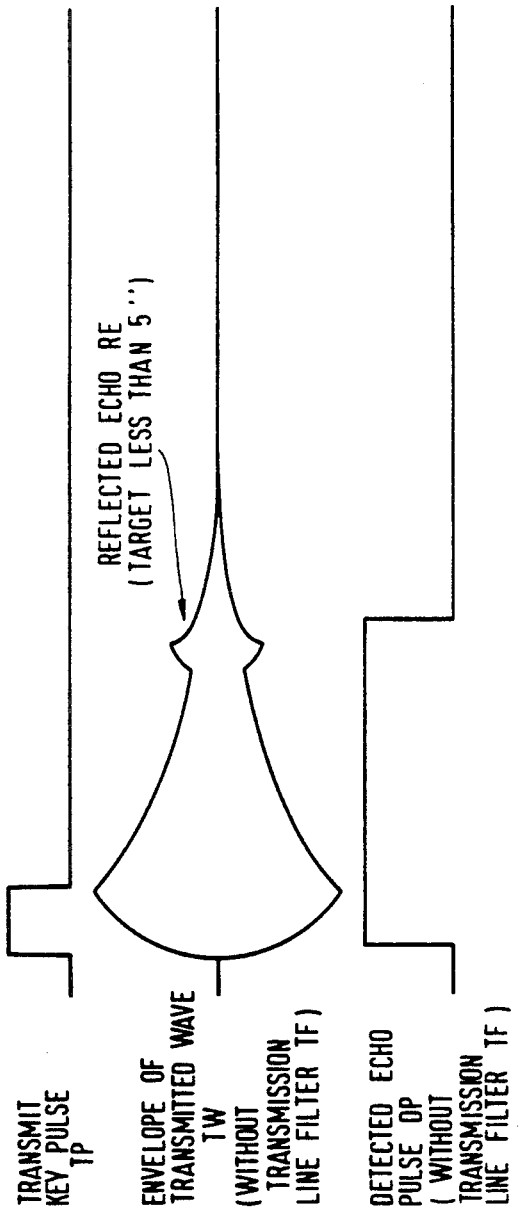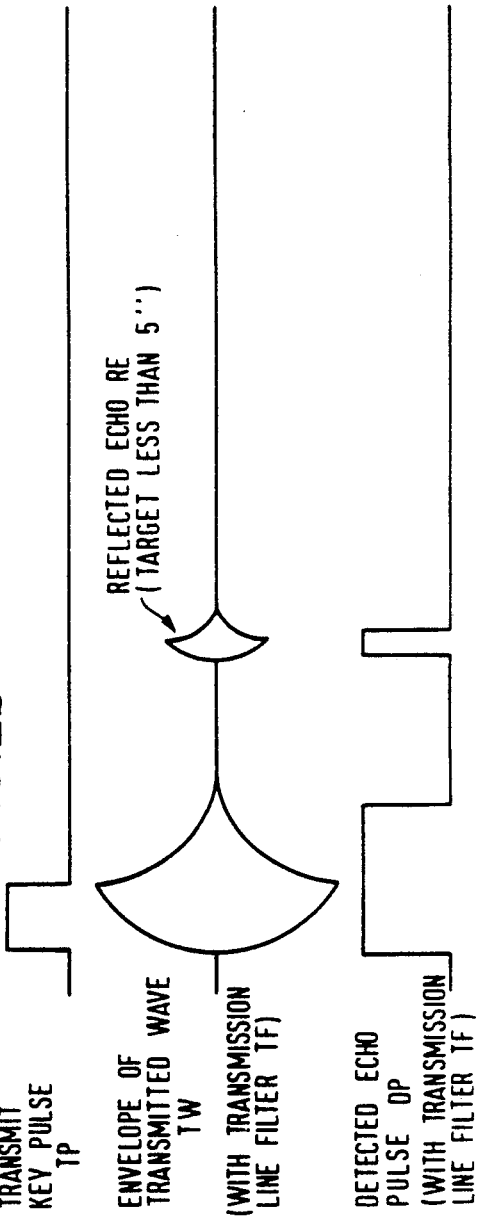

MEAN VALUE FORMATION

LOW PASS FILTER

INK SURFACE ALGORITHM

ECHO TIME PROCESSING ALGORITHM

CALCULATE DATA STORAGE

INK LEVEL CONTROL SYSTEM FOR OFFSET PRINTING PRESSES

BACKGROUND OF THE INVENTION

This invention relates to an apparatus and a method for controlling the level of ink in a fountain for offset printing presses.

In offset printing presses, ink is used to transfer images from the printing plate to the impression blanket roller and then to the paper. The ink is stored in a fountain or reservoir and is transferred to a fountain roller which is in intimate contact with the ink. From the fountain, the ink flows to the printing plate via a series of ink train rollers. The consistency of the printed image is significantly affected by the ink film thickness on the ink train rollers. The ink film thickness is controlled, in part, by the amount of ink surface exposure to the fountain. Therefore, constant monitoring of the fountain ink level and make-up of the ink supply is necessary to maintain quality output of the printed product from the offset printing press.

Several techniques have been employed to sense the level of ink in offset printing press fountains, including floats (see U.S. Pat. No. 3,025,798), tactile or mechanical sensors (see U.S. Pat. Nos. 3,373,052 and 3,848,529), pneumatic sensors, capacitive sensors (see U.S. Pat. No. 4,010,683) and ultrasonic sensors. The techniques which require intimate contact with the ink in the fountain (floats, tactile and pneumatic sensors) have proven to be unreliable.

Both capacitive and ultrasonic sensors have been used in a variety of apparatus to measure the level of the ink supply. The capacitive apparatus measures the change in ink level by monitoring the change in the dielectric constant of a capacitor formed using an electrode as one plate and the fountain metal as the second plate. The air and ink separating the plates act as the dielectric.

Apparatus using ultrasonic sensing detects the change in ink level by measuring the time between transmitting a burst of sonic energy from a transducer and receiving an echo of that emitted energy. The echo is the reflection from the surface of the ink. Typically, the transducer consists of a piezo-ceramic element which is used to convert electrical energy to mechanical energy when transmitting and mechanical energy to electrical energy when receiving. Knowledge of the speed of sound in the air at ambient temperature permits calculation of the distance separating the transducer and the ink surface, thus making changes in the height of the ink surface detectable. When the level of the ink surface falls below the desired level or set-point, an electrical signal is generated which causes an electrically actuated valve to open. When the valve is opened, a flow of ink is established from a storage tank to the ink fountain. The level of the ink is measured using the ultrasonic sensor until it rises above the desired level or set-point, then the electrical signal to the electrically actuated valve is turned off, and the flow of ink from the storage tank to the ink fountain is interrupted. The monitoring of the ink supply using an ultrasonic transducer is relatively complex. Factors such as ink surface air bubbles, hills and valleys (disturbances to the surface of highly viscous, unmixed inks will last for long periods of time), large disturbances caused by mechanical ink mixers employed in the fountain and movement of the air separating the transducer and the ink surface can cause the echo reflected from the ink surface to disappear intermittently or to vary considerably from reading to reading. This measurement instability increases the complexity of the control circuitry and software programs (if used) significantly.

SUMMARY OF THE INVENTION

It is the object of the present invention to provide an apparatus having circuitry and software programs for monitoring and controlling offset printing press fountain ink level in a reliable and accurate manner. Advantages derived from such apparatus include minimizing control valve wear and reducing the cost of manufacture.

A feature of the present invention provides for an apparatus for monitoring and controlling the level of the ink in the ink fountain of offset printing presses. The apparatus uses an ultrasonic transducer for measuring the distance between the ink and the transducer.

When the resonant system consisting of the transducer, its cable and the ultrasonic transceiver is not critically damped, the transmit burst overring (i.e. self-oscillation which continues after the source of transducer driving energy is removed) obscures echos from targets at about 5 inches or less. A tunable transmission line filter permits adjusting the resonant system to minimize sonic transmit burst overring enough to allow measurement of distance to surfaces closer than 5 inches from the transducer.

One advantage of the present invention is that the dynamic response of the control system is matched to the viscosity characteristic of the fountain ink, thus improving the accuracy of maintaining the ink level control set-point. The stored control software echo time processing algorithm takes into account the amount of time the ink requires to establish a new level (related to the viscosity of the ink) after depletion by supplying ink to the ink train or by filling from the storage tank through the control valve. The algorithm also cancels the effect of the gross disturbance caused by the passage of a mechanical ink mixer under the measuring area of the transducer. The long term behavior of the ink level is evaluated using a mean value formation based on a periodic sampling of successive values of ink level measurements. The time base of the sampling technique is directly related to the ink viscosity entered into the controller during calibration and stored in calibrate data storage.

Another advantage of the invention is that the controller software monitors variation of the ink surface using an ink surface algorithm which modifies an echo time processing algorithm to properly account for the amount of instability caused by air bubbles or hills and valleys set into the ink's surface. The short term behavior of the ink level is monitored using a mean value formation algorithm based on a periodic sampling of successive differences between ink level measurements. The result of balancing the evaluation of the long term ink level variation and the short term surface variability is to determine the best repetition rate of ink feed cycles to establish acceptable accuracy of controlled level while extending control valve life.

Other objects, features and advantages of the invention will be readily apparent from the following description of certain preferred embodiments thereof taken in conjunction with the accompanying drawing although variations and modifications may be effected

BRIEF DESCRIPTION OF THE DRAWINGS

FIG. 2A is a graphical illustration of a transmit wave and a received echo without a transmission line filter according to the present invention.

FIG. 2B is another graphical illustration of a transmit wave and a received echo with a transmission line filter according to the present invention.

DESCRIPTION OF THE PREFERRED EMBODIMENT

Figure 1:
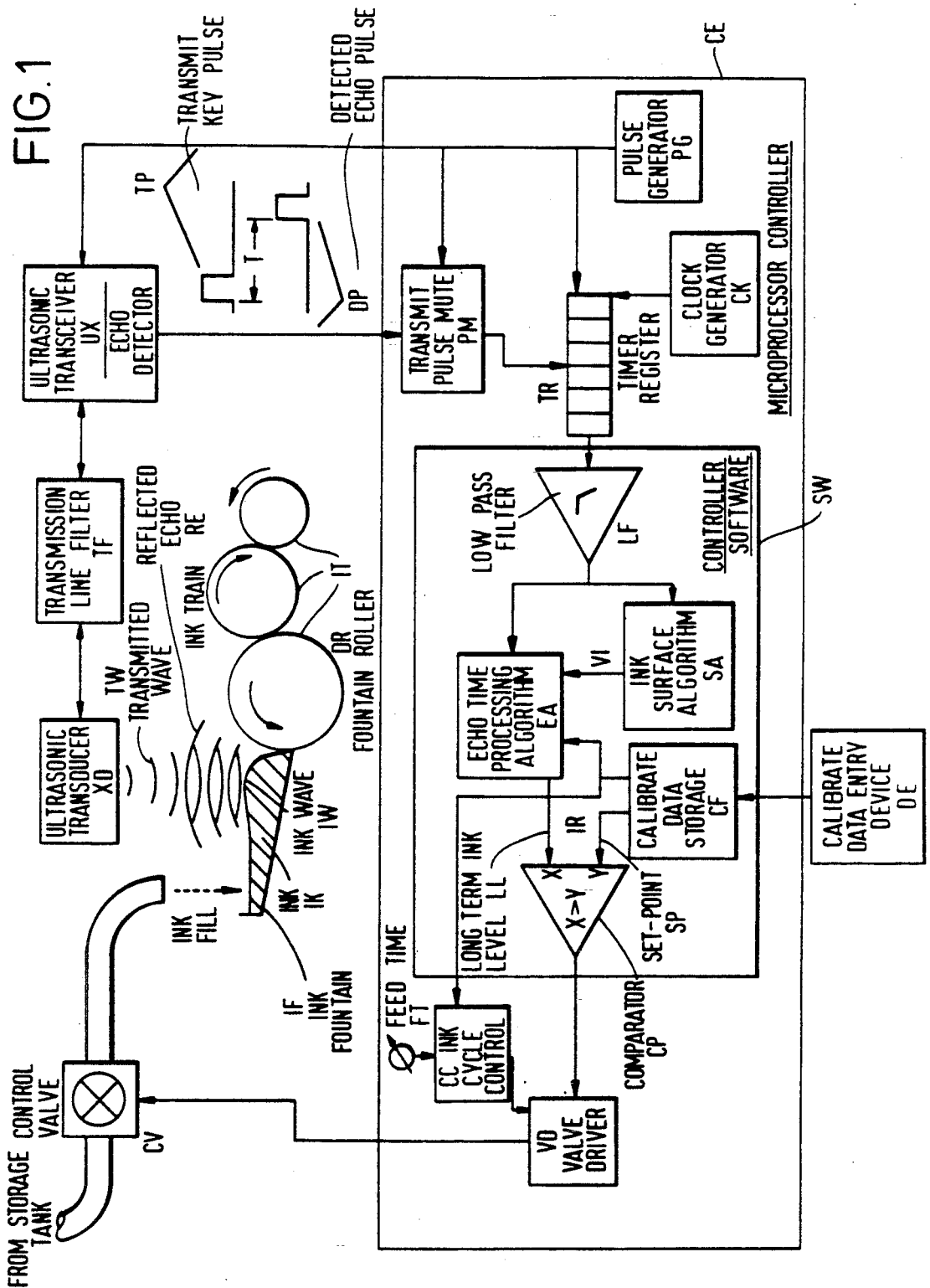
FIG. 1 is a system block diagram for the ink level control system according to the present invention.

In FIG. 1, a fountain reservoir IF on an offset printing press supplies ink to printing plate (not shown) to transfer images to the blanket roller (not shown) via the fountain roller DR of the ink train IT. An ultrasonic transducer XD mounted above the ink wave IW produced by the rotary motion of the fountain roller DR is used as a sensor to measure the distance from the transducer to the surface of the ink at the top of the ink wave IW.

In microprocessor controller CE, a pulse generator PG produces a transmit pulse TP to key the ultrasonic transceiver UX transmitter and to simultaneously start clocking a timer register TR by clock generator CK. The transmitted electrical oscillations from the ultrasonic transceiver UX are shaped by transmission line filter TF and applied to the ultrasonic transducer XD. The ultrasonic transducer XD converts the received signals into an energy burst propagated as a sonic transmitted wave TW. When the transmitted wave TW strikes the surface of the ink IK in the fountain IF, the resulting reflected echo RE impinges on the ultrasonic transducer XD and is converted to electrical oscillations which are shaped, in turn, by the transmission line filter TF. The ultrasonic transceiver UX receiver converts the reflected echo's electrical oscillations to produce a detected echo pulse DP which is used to stop the clocking of the timer register TR in the microprocessor controller CE. A transmit energy burst of sufficiently high amplitude may produce multiple re-reflected echoes which are detectable by the receiver. The resulting undesirable detected echo pulses are eliminated by the transmit pulse mute PM in the microprocessor controller CE.

The captured count in the timer register TR includes the measurement of the distance from the ultrasonic transducer XD and the ink surface. This distance can be calculated because the speed of sound in air at ambient temperature and the frequency of the timer register clock CK are known.

Figure 3A:
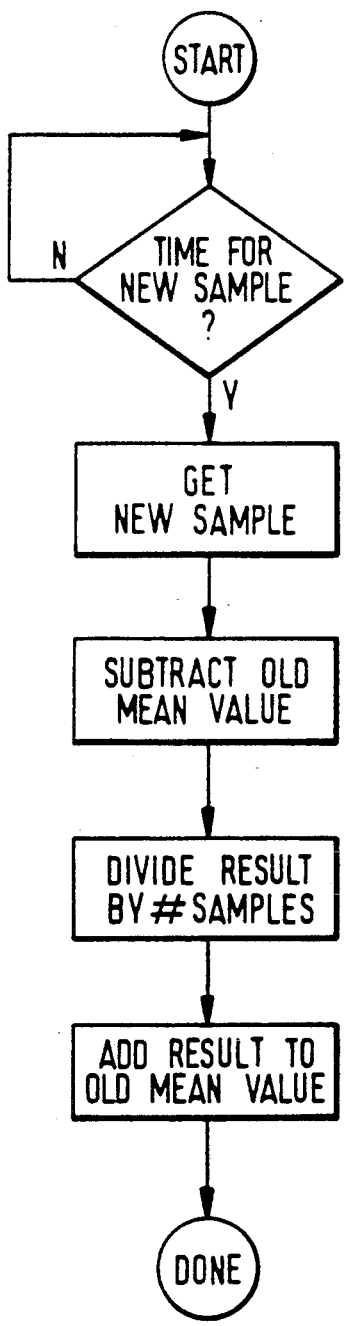
FIGS. 3A to 3F are flow charts for the software controls according to the present invention.
Figure 3B:
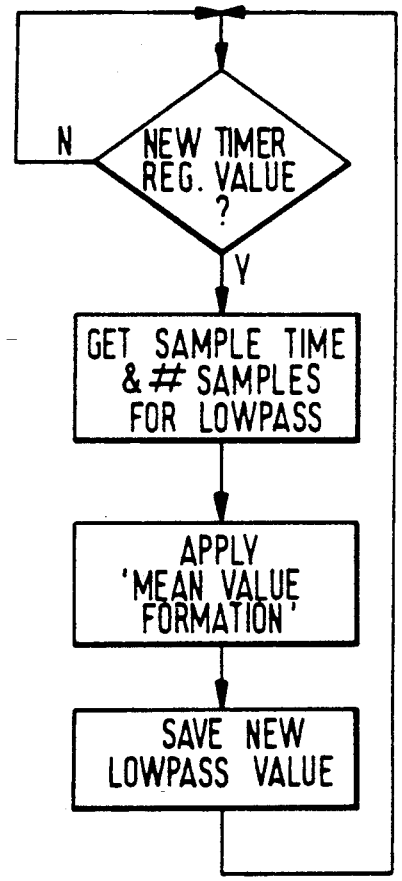
Figure 3C:
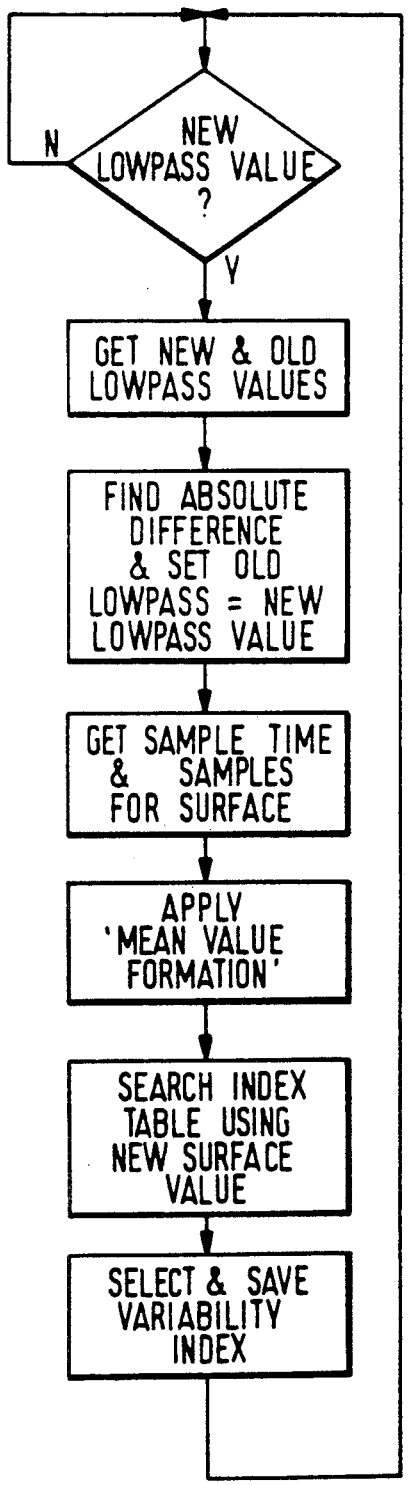

The count captured in timer register TR is processed by a low-pass filter LF to smooth out high frequency variations due to electrical background noise and noise produced by movement of the air between the ultrasonic transducer XD and the ink surface. The low-pass filtered count value is supplied to the ink surface algorithm SA of the controller software SW which determines the absolute value of the difference between this current filtered count value and the last received filtered count value. A sampled, mean value formation is applied to the absolute value of the difference to update the surface variability index VI. The mean value formation, low pass filter and ink surface algorithm flow diagrams are shown in FIGS. 3A, 3B and 3C, respectively.

Figure 3D:
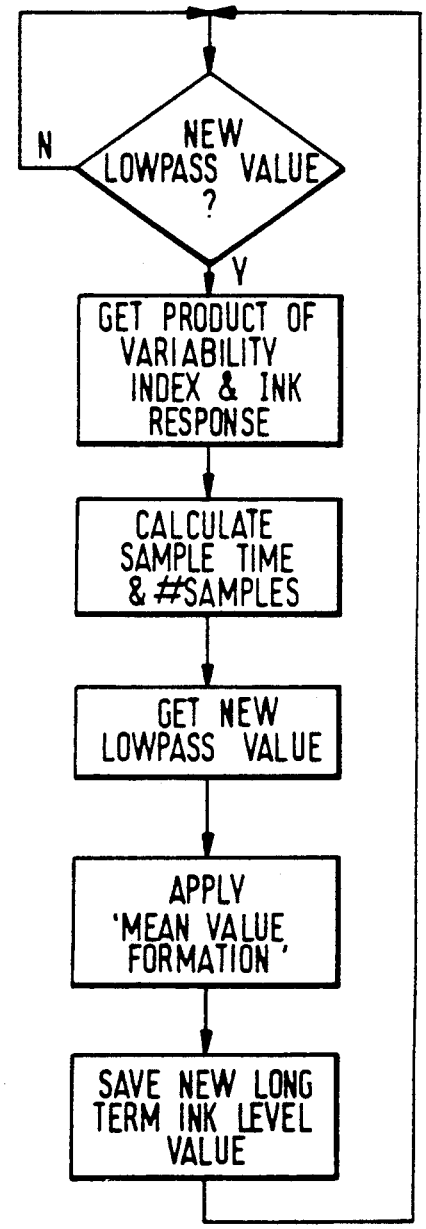

The echo time processing algorithm EA in the controller software SW shown in FIG. 3D uses the captured timer register TR count to calculate an unadjusted, long term mean value formation of the ink level and to determine the timing of the ink feed cycle. The sampling time period and the number of samples to be used in the mean value formation is determined by the ink response IR supplied from calibrate data storage CF. The ink response IR is measured for the ink IK being used in the fountain IF and is entered into the microprocessor controller CE via calibrate data entry device DE. The new, unadjusted, long term ink level is corrected for ink surface variations by applying the surface variability index VI to modify the sampling time period and the number of samples used in the mean value formation process to yield a new value of adjusted, long term ink level LL.

Figure 3E:
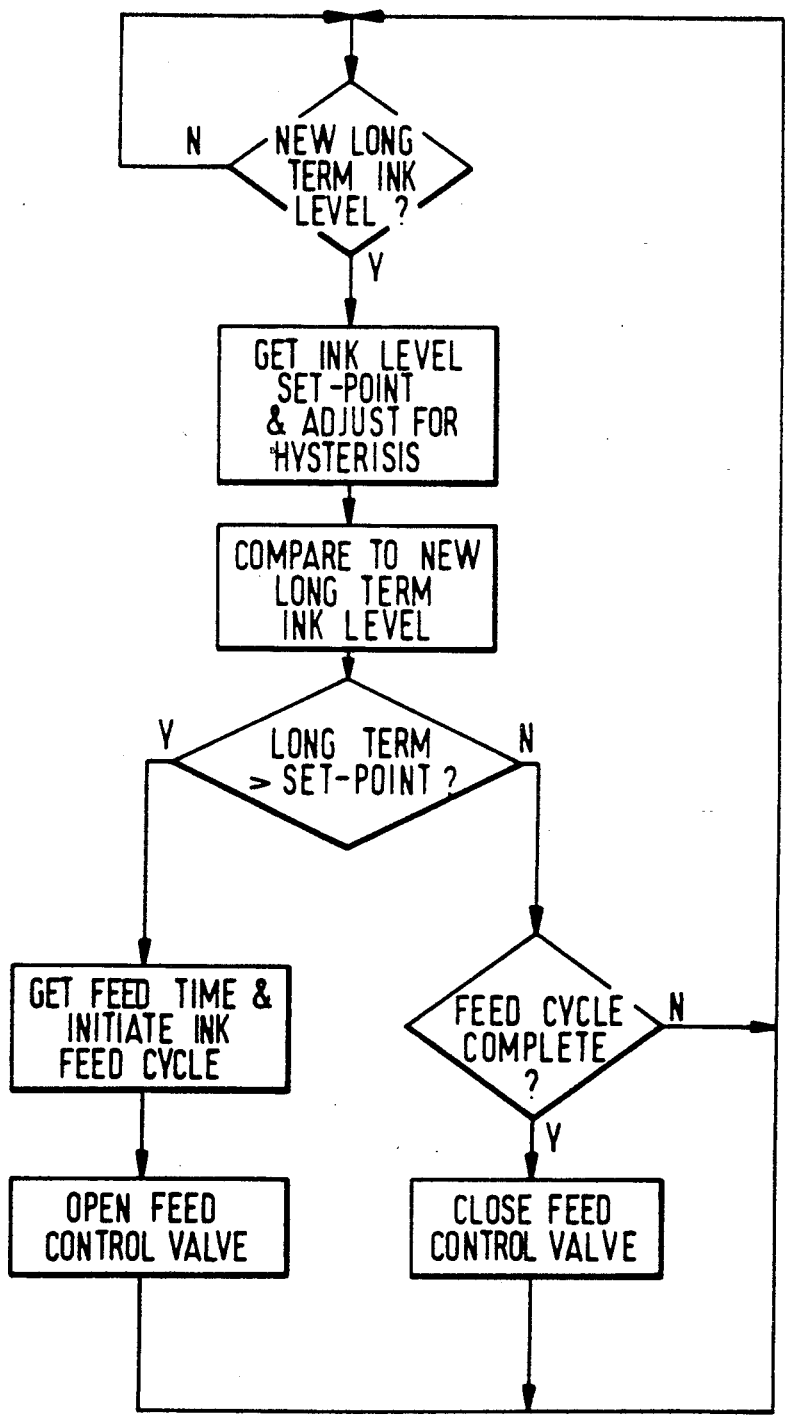
Figure 3F:
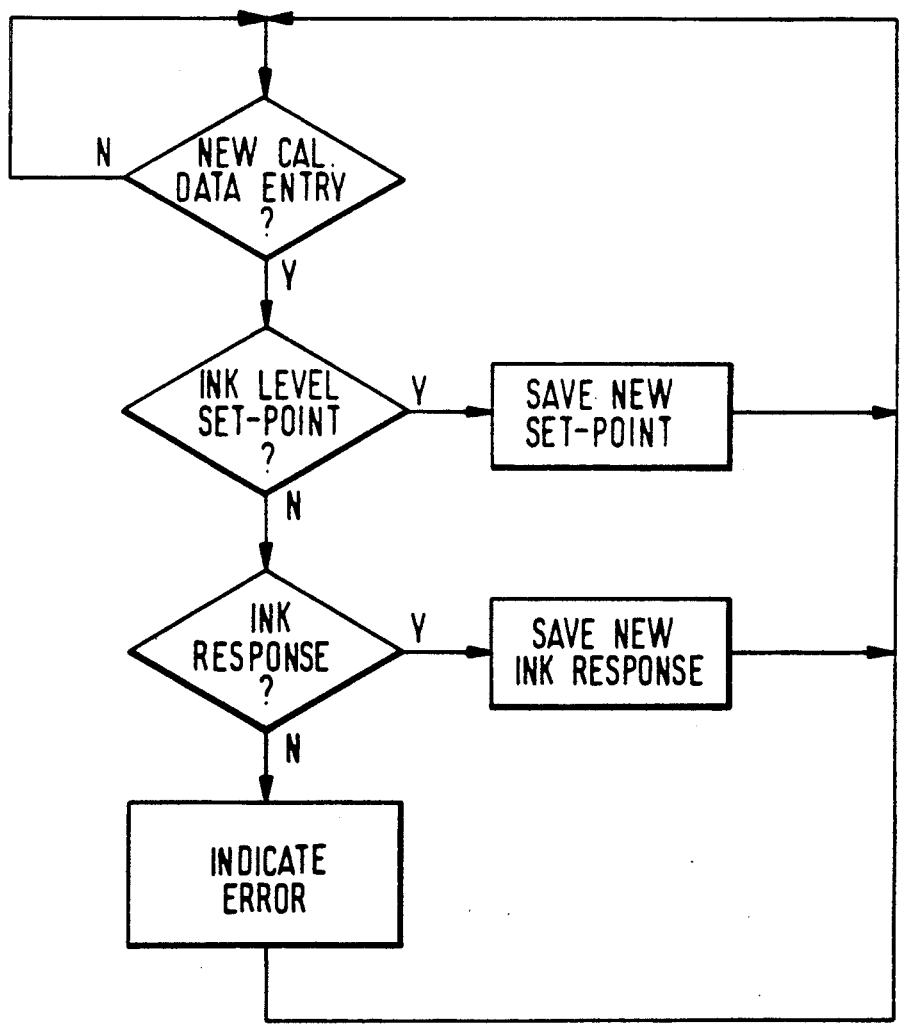

The adjusted, long term ink level LL is applied to a comparator CP in the controller software SW. As shown in FIG. 3E, if the adjusted, long term ink level LL is greater than the set-point level SP supplied from the calibrate data storage CF, indicating the ink level has dropped, an ink feed cycle is initiated by producing a signal to the valve driver VD which opens the control valve CV. The set-point level SP is ascertained from the printing press operator's experience in judging the correct level to maintain acceptable ink coverage consistency and is entered into the microprocessor controller CE via the calibrate data entry device DE.

Feed cycles will continue to be initiated until repeated measurement of the ink level and application of the echo time processing algorithm EA and the ink surface algorithm SA produce an adjusted, long term ink level LL which is less than the sum of the set-point level SP and a small amount of hysterisis included for stability of control.

The ability of the ink control system to detect reflected echos RE from ink wave IW surfaces located less than approximately 5 inches from ultrasonic transducer XD is affected by the time duration of self-oscillation overring occurring in the ultrasonic transducer after excitation by the transmit key pulse TP. This phenomena is illustrated in FIG. 2a where the transducer system does not include the transmission line filter TF. Throughout the duration of the transmit key pulse TP, oscillations are built-up in the ultrasonic transducer XD. After the transmit key pulse is de-activated, the ultrasonic transducer element continues to oscillate. The amplitude of the oscillations gradually die out as energy is dissipated in mechanical and electrical losses. For a typical transducer system which includes a transducer, a cable and driver elements, these oscillations are detectable by the ultrasonic transceiver UX receiver for 400 to 800 microseconds, depending on the sensitivity of the receiver. In FIG. 2a, an illustrative target echo reflection RE is shown as being included with the transmit burst overring. The resulting detected echo pulse DP has no distinction between the target echo and the overring.

FIG. 2b illustrates the waveforms occurring when the transmission line filter TF is included in the transducer system. The time duration of the ultrasonic transducer XD self-oscillation overring is reduced sufficiently by the filter to allow distinction of the target echo reflection RE at the ultrasonic transceiver UX receiver. The transmit burst portion of the detected echo pulse DP is eliminated by the transmit pulse mute PM in the microprocessor controller CE. The duration of the overring is controlled by including sufficient capacitance in the transmission line filter TF to render the transducer system critically damped.

According to a preferred embodiment of the present invention, an inductor is tuned with the capacitance of the transmission line filter TF at ⅓rd of the natural resonant frequency of the ultrasonic transducer XD. Sufficient gain is maintained in the ultrasonic transceiver UX and the ultrasonic transducer XD such that the reduction in gain when using ⅓rd of the natural resonant frequency instead of ½ or the fundamental frequency is compensated for.

The ultrasonic transducer XD, which may be a model E-188/215 available from Massa Products Corporation, resonates at approximately 215 kilohertz. The driver element may be a ferrite-core, tunable autotransformer with an inductance of approximately 370 microhenry and a turns ratio of approximately 10-to-1 available from the TOKO America, Inc. Company. The capacitance for the transmission line filter TF is approximately 13,600 picofarad. When these elements and the connecting cable are combined, the autotransformer is tuned to resonate at ⅓ of the natural transducer system frequency or approximately 71 kilohertz. The resonate envelope signal is monitored using an oscilloscope and the autotransformer is tuned to achieve minimum oscillation overring which also results in a maximum envelope for the reflected echo RE signal.

The ultrasonic transceiver UX may be a type LM1812 available from the National Semiconductor Company. The microprocessor controller CE may be a type MC68HC11 available from the MOTOROLA, INC. Company which includes an analog-to-digital converter, high-speed timers and electrically erasable and programmable read-only memory. The memory can be alternatively supported externally by other memory means such as programmable read-only memory and random access memory. The controller software SW may reside in the programmable read-only memory. The calibrate data entry device DE may be a standard, telephone type, 10-digit with * and #, keypad and 2-digit, LED, numeric display.

Calibration data is input to the microprocessor controller CE using the calibrate data entry device DE and is stored within the electrically erasable and programmable read-only memory as calibrate data storage CF.

FIG. 3A illustrates the computation flow chart of the mean value of formation according to the present invention. A value Xs is periodically sampled at a specific time interval T. The value Xs, obtained at each sample interval, is used to compute the mean value of formation X, which is the average value or arithmetic mean of the entire field of samples N. Computational and memory storage efficiency is achieved by using an approximation for calculation of the new average value $X'$:

$$X' = X + \frac{(Xs - X)}{N}$$

This process is repeated when each new value, Xs, is obtained at the end of sampling interval T. The error in this technique when compared to using a standard calculation of mean (sum of all values, divided by the number of values) is very small if a large number of samples is involved and the difference between the mean value of formation, X, and the new value, Xs, is small. The error is:

$$\text{error} = \frac{(X - Xs)}{(N * Xstd)}$$

where Xstd is the mean value as calculated by the standard method. In can also be shown that this periodic sampling technique exhibits a time response equivalent to the time constant in a natural logarithmic (Naperian base e) phenomena. The calculation for 1 natural log time constant is:

$$\text{time constant} = N * T * 0.9$$

As shown in FIG. 3B, the low pass filter LF in the controller software SW is used to smooth out variations caused by random electrical noise and short term changes in the air between the ultrasonic transducer XD and the surface of the ink IW. The timer register TR containing a count value representing the detected echo pulse DP is sampled and a mean value of formation is calculated using a time constant of approximately 0.5 seconds.

The low pass filter LF output is applied to the ink surface algorithm SA in the controller software SW. The ink surface algorithm flow chart is shown in FIG. 3C. For each new value of low pass filter LF output, the last previous value of low pass filter LF output is subtracted and the absolute value of this difference is divided by the new value. Using this quotient, a mean value of formation is calculated using a time constant of approximately 10 minutes. This result is used to select a number from 1 to 5 for the surface variability index VI, where 1 represents a very smooth surface and 5 a very rough surface.

The calibrate data entry device DE is used to enter the desired control set-point SP and the ink response (related to viscosity) IR into the calibrate data storage CF section of the controller software SW in the microprocessor controller CE. The control set-point SP is the distance to be maintained from the bottom of the ink fountain IF to the ink surface IW, as measured directly beneath the ultrasonic transducer XD. The ink response IR is an index from 1 to 5 where 1 represents a thin ink and 5 represents a very thick ink consistency.

The echo time processing algorithm EA shown in FIG. 3D uses the low pass filter LF output as the input for calculating a mean value of formation yielding a number for the long term ink level LL. The echo time processing algorithm EA adjusts the time constant of the mean value of formation process in accordance with the indices for ink surface variability VI and ink response IR. The range of time constant selection is approximately 0.1 minutes for the thinnest inks with the smoothest surfaces to 1.5 minutes for the most viscous inks with the roughest surfaces. The time constant for the mean value of formation process is varied by adjusting the value of sample field size N and sample time period T.

The ink cycle control CC portion of the controller software SW in the microprocessor controller CE utilizes the ink response IR from the calibrate data storage CF to select the control valve CV cycle time which is the sum of the control valve CV on time and the control valve CV off time. The range of cycle time is approximately 0.5 minutes for thin inks (ink response=1) to 4.5 minutes for the most viscous inks (ink response=5) and is chosen to allow the ink IK in the ink fountain IF to seek a new level when an ink feed from the storage tank through the control value CV has occurred. The control valve CV on time is manually adjustable using the feed time FT control to permit matching the ink feed characteristics to the individual printing press.

The comparator CP section of the controller software SW in the microprocessor controller CE evaluates the long term ink level LL from the echo time processing algorithm EA and the control set-point SP from the calibrate data storage CF. As shown in FIG. 3E, if the long term ink level LL has fallen below the desired control set-point SP, feed cycles are initiated, using the valve driver VD to open the control valve CV and permit ink fill from the storage tank to take place. If the long term ink level LL has risen above the sum of the desired control set-point SP and a small amount of hysterisis for control stability, feed cycles are terminated.

Although the invention has been described with respect to preferred embodiments, it is not to be so limited as changes and modifications can be made which are within the full intended scope of the invention as defined by the appended claims.

I claim:

1. An apparatus for monitoring ink supply in an ink fountain for offset printing presses, comprising:
   an ink fountain;
   a transducer capable of receiving an electrical signal and converting said signal to a sonic wave and receiving a sonic wave and converting said wave to an electrical signal;
   a transmitter for transmitting an electrical signal to said transducer for causing a sonic wave reflection from said ink fountain;
   a receiver for receiving a signal reflected from said ink fountain through said transducer;
   data entry means for entering data including preset ink level and ink viscosity characteristics;
   memory means for storage of said data;
   microprocessor means having a stored program for controlling said transmitter and receiver of said electrical signal, for processing the time occurrence of said transmitted and reflected signals for determining the ink level in said ink fountain, for calculating the time direction of an ink feed cycle to fill said ink fountain to said preset ink level and for generating an ink cycle control signal based on said time direction data and said ink viscosity characteristics; and
   a control valve activated by said ink cycle control signal for delivering ink to said ink fountain.

2. An apparatus according to claim 1 including a transmission line filter for processing said transmitted and reflected electrical signals between said transducer and said transmitter and receiver.

3. An apparatus according to claim 2 wherein said line filter reduces signal noise reflections sufficiently to enable the detection of reflected wave from the ink surface of said ink fountain to within three inches of said transducer.

4. An apparatus according to claim 1, wherein said microprocessor means includes a stored program for monitoring variations of the ink surface and producing variation data therefrom.

5. An apparatus according to claim 1 wherein said microprocessor means calculates a long term average of change of ink level.

6. An apparatus according to claim 1, wherein said microprocessor means includes a low pass filter.

7. An apparatus according to claim 6, wherein a mean value of formation is determined by obtaining samples of each ink filling interval and updating said mean value by subtracting the old mean value of formation from the newly sampled value, dividing the result by the number of samples, N, and adding the quotient to the old mean value of formation.

8. A method for monitoring ink supply in an ink fountain for offset printing presses, comprising:
   supplying ink into an ink fountain;
   inputting data including preset ink level and ink viscosity characteristics; storing said data in memory;
   generating a time-marked electrical signal pulse with a microprocessor having a stored program;
   converting said electrical signal pulse into a sonic wave;
   reflecting said sonic wave from said ink fountain;
   receiving said reflected sonic wave;
   converting said reflected sonic wave into a reflected electrical signal;
   processing of data in response to said stored program, including the time occurrence of said time-marked pulse and said reflected electrical signal for determining the ink level of said ink fountain and calculating the time duration of an ink feed cycle necessary for filling the ink level to said preset ink level;
   generating a signal based on said time duration data and said ink viscosity characteristics; and
   adjusting the ink level of said ink fountain by activating a control valve in response to said generated signal.

9. A method according to claim 8, wherein said processing step includes adjustments for ink surface variability.

10. A method according to claim 8, wherein said data includes a long-term average of change in ink level.

11. A method according to claim 8, including the step of low pass filtering.

12. A method according to claim 8, including the step of calculating a mean value of formation by obtaining samples of each ink filling interval and updating said mean value by subtracting the old mean value of formation from the newly sampled value, dividing the result by the number of samples, N, and adding the quotient to the old mean value of formation.

* * * * *